US012753635B2

(12) United States Patent
Zhang et al.

(10) Patent No.: US 12,753,635 B2
(45) Date of Patent: Oct. 6, 2026

(54) ELECTRONIC DOOR LOCK WITH CLUTCH

(71) Applicant: Guangdong Manshen Intelligent Technology Co., Ltd., Zhongshan (CN)

(72) Inventors: Baoqiang Zhang, Zhongshan (CN); Pengfei Zhang, Zhongshan (CN)

(73) Assignee: Guangdong Manshen Intelligent Technology Co., Ltd., Zhongshan (CN)

( * ) Notice: Subject to any disclaimer, the term of this patent is extended or adjusted under 35 U.S.C. 154(b) by 0 days.

(21) Appl. No.: 18/981,281

(22) Filed: Dec. 13, 2024

(65) Prior Publication Data

US 2026/0117561 A1 Apr. 30, 2026

(30) Foreign Application Priority Data

Oct. 24, 2024 (CN) ........................ 202422581433.2

(51) Int. Cl.
*E05B 47/00* (2006.01)

(52) U.S. Cl.
CPC .. *E05B 47/0012* (2013.01); *E05B 2047/0016* (2013.01); *E05B 2047/0026* (2013.01); *E05B 2047/0094* (2013.01)

(58) Field of Classification Search
CPC ............ E05B 17/0054; E05B 17/0058; E05B 17/044; E05B 17/045; E05B 17/046; E05B 2047/0017; E05B 2047/0018; E05B 2047/002; E05B 2047/0024; E05B 2047/0025; E05B 2047/0026; E05B 2047/008; E05B 47/02; E05B 47/06; E05B 47/0615; E05B 47/0657
See application file for complete search history.

(56) References Cited

U.S. PATENT DOCUMENTS

| | | | | |
|---|---|---|---|---|
| 2021/0174620 | A1* | 6/2021 | Kusanale ............ | E05B 47/0012 |
| 2023/0332435 | A1* | 10/2023 | Zhang ................. | E05B 47/0012 |
| 2024/0183196 | A1* | 6/2024 | Wang .................. | E05B 47/0012 |

* cited by examiner

*Primary Examiner* — Christine M Mills
*Assistant Examiner* — Yahya Sidky
(74) *Attorney, Agent, or Firm* — FIDELI LAW PLLC; Qiang Li

(57) ABSTRACT

Provided in the present disclosure is an electronic door lock with a clutch, including an external lock. The external lock includes: a front housing; a front knob assembly rotatably inserted into the front housing, where a rotation limiting structure is disposed between the front housing and the front knob assembly; a lock cylinder mounted on the front knob assembly and provided with a tail rack at a tail end; a clutch component that is connected to the tail rack to be capable of rotating together with the tail rack and can rotate relative to the front knob assembly; and a motor clutch assembly disposed on the front housing. The clutch component is provided with convex portions. The front knob assembly is provided with a convex column. When not supplied with power, the motor clutch assembly is in a reset state, and the front knob assembly can be rotated for locking.

10 Claims, 10 Drawing Sheets

ELECTRONIC DOOR LOCK WITH CLUTCH

RELATED APPLICATIONS

The present patent document claims the benefit of priority to patent application No. 202422581433.2, filed Oct. 24, 2024, and entitled "ELECTRONIC DOOR LOCK WITH CLUTCH," the entire contents of each of which are incorporated herein by reference.

BACKGROUND

1. Technical Field

The present disclosure relates to the technical field of door locks, in particular to an electronic door lock with a clutch.

2. Background Information

The electronic door lock usually includes an internal lock, an external lock, and other structures. The internal lock and the external lock are disposed on two sides of a door respectively. A lock body matched with the internal lock and the external lock is mounted in the door. For some electronic door locks, the external lock is provided with a motor clutch assembly, a key hole, and a rotatable external handle. During unlocking outside the door, after receiving correct NFC, password, fingerprint, and other signals, a control system of the door lock controls the motor clutch assembly to be powered to operate forwards to link the lock body with the external handle, and the external handle can be rotated for unlocking. Similarly, during locking outside the door, the control system controls the motor clutch assembly to be powered to operate forwards to link the lock body with the external handle, and the external handle can be rotated for locking. The motor clutch assembly will automatically operate in reverse to be reset after working to release the linkage between the lock body and the external handle.

However, for the above structure, the motor clutch assembly needs to be supplied with power to work during both locking and unlocking, which consumes a large amount of power for the electronic door lock, shortens the battery life of the electronic door lock, and increases the frequency of battery replacement. In addition, if the electronic door lock fails or the power is used up, the motor clutch assembly is not supplied with power and is in a reset state, so that the lock body and the external handle cannot be linked, and a locking operation cannot be performed by rotating the external handle. At this time, a user needs to use a key to perform the locking operation, thereby making the locking operation outside the door more complex.

BRIEF SUMMARY

An objective of the present disclosure is to provide an electronic door lock with a clutch, which can facilitate locking outside a door and reduce power consumption.

To achieve the above objective, an electronic door lock with a clutch is provided, including an external lock. The external lock includes: a front housing; a front knob assembly rotatably inserted into the front housing, where a rotation limiting structure is disposed between the front housing and the front knob assembly, and the rotation limiting structure is configured to limit a rotation angle of the front knob assembly relative to the front housing; a lock cylinder mounted on the front knob assembly and provided with a tail rack at a tail end, where the tail rack is configured to be connected to a lock body and is rotatable relative to the lock cylinder; a clutch component that is connected to the tail rack to be capable of rotating together with the tail rack and is rotatable relative to the front knob assembly; and a motor clutch assembly that is disposed on the front housing and is capable of being electrically driven to limit rotation of the clutch component relative to the front knob assembly. The clutch component is provided with convex portions, and the front knob assembly is provided with a convex column in press fit with the convex portions. When the electronic door lock is unlocked, the convex portions are located within a rotation range of the convex column. When the electronic door lock is locked, the convex portions are outside the rotation range of the convex column.

According to the electronic door lock with a clutch, the rotation limiting structure includes a first anti-rotation portion, second anti-rotation portions, and a third anti-rotation portion, where the first anti-rotation portion is fixedly disposed on the front knob assembly, the second anti-rotation portions and the third anti-rotation portion are both fixedly disposed on the front housing, the two second anti-rotation portions are disposed on two sides of the third anti-rotation portion respectively, and when the front knob assembly rotates, the first anti-rotation portion is capable of pressing against the second anti-rotation portions; and the front knob assembly or the front housing is sleeved with a first torsion spring, and two torsion arms of the first torsion spring are disposed on two sides of each of the first anti-rotation portion and the third anti-rotation portion respectively.

According to the electronic door lock with a clutch, the front knob assembly includes a front knob cap, a fixed component, and a rotating component, where the front knob cap and the rotating component are disposed on two sides of the front housing respectively, the fixed component is rotatably inserted into the front housing and is fixedly connected to the front knob cap and the rotating component separately, a fixed cavity is defined between the front knob cap and the fixed component, the lock cylinder is disposed in the fixed cavity, and the tail rack extends backward from the rotating component.

According to the electronic door lock with a clutch, a rear side of the rotating component is provided with a first mounting groove, the clutch component is rotatably inserted into the first mounting groove, and the tail rack penetrates through the clutch component.

According to the electronic door lock with a clutch, the motor clutch assembly includes a motor clutch, a pin, and a spring component, where the motor clutch is disposed on the front housing and is provided with a pressing strip at an output end, the pin is slidably inserted into the front knob assembly and located between the clutch component and the pressing strip, a sidewall of the clutch component is provided with clutch grooves for insertion of the pin, and the spring component is disposed between the pin and the front knob assembly; the motor clutch is configured to push the pin by the pressing strip to move towards the clutch component, and the spring component is configured to push the pin to move away from the clutch component; and when the electronic door lock is locked, the clutch grooves are opposite to the pin.

According to the electronic door lock with a clutch, the two clutch grooves are disposed on two sides of the clutch component respectively, and the two convex portions are also disposed on the two sides of the clutch component respectively.

According to the electronic door lock with a clutch, a rear side of the front housing is provided with a first cover, a rear side of the first cover is provided with a cylinder shell and column rods located on an inner side of the cylinder shell, and the at least two column rods are arranged in parallel.

According to the electronic door lock with a clutch, a rear lock is further included, where the rear lock includes a rear housing and a rear knob assembly disposed on the rear housing, and the rear knob assembly is provided with a transmission insertion hole opposite to the tail rack.

According to the electronic door lock with a clutch, the rear knob assembly includes a rear knob cap, a limiting component, and a snap spring, where the rear knob cap and the limiting component are disposed on two sides of the rear housing respectively, the rear knob cap has a shaft section rotatably inserted into the rear housing and a mounting section slidably inserted into the limiting component, the snap spring is located on one side of the limiting component facing away from the rear housing and is snapped and sleeved on the mounting section, and elastic limiting structures are disposed between the limiting component and the rear housing.

According to the electronic door lock with a clutch, each of the elastic limiting structures includes a first limiting column, a second limiting column, a third limiting column, a limiting screw, and a second torsion spring, where the first limiting column and the second limiting column are fixedly disposed on the rear housing at intervals, the third limiting column is fixedly disposed on the limiting component, the limiting screw is disposed on the second limiting column and abuts against a sidewall of the limiting component, and the second torsion spring is fixedly connected to the first limiting column and the third limiting column separately; and the two elastic limiting structures are disposed on two sides of the shaft section respectively.

The beneficial effects are as follows: the electronic door lock can be locked and unlocked by inserting a key into the lock cylinder; when the electronic door lock can be supplied with power, the motor clutch assembly is supplied with power and operates forward to link the front knob assembly with the clutch component, and the front knob assembly can be rotated for locking and unlocking; when not supplied with power, the motor clutch assembly is in a reset state, and the front knob assembly can be rotated for locking without inserting the key, thereby bringing the use convenience for a user; during locking, the motor clutch assembly does not need to be supplied with power to operate, which can reduce power consumption; and it is convenient for locking when the electronic door lock fails or the power is used up.

The additional aspects and advantages of the present disclosure will be partially given in the description below, and part of them will become apparent from the description below or will be learned from the practice of the present disclosure.

BRIEF DESCRIPTION OF THE DRAWINGS

The present disclosure is further described below with reference to the accompanying drawings and the embodiments.

DETAILED DESCRIPTION OF THE DRAWINGS AND THE PRESENTLY PREFERRED EMBODIMENTS

Figure 1:
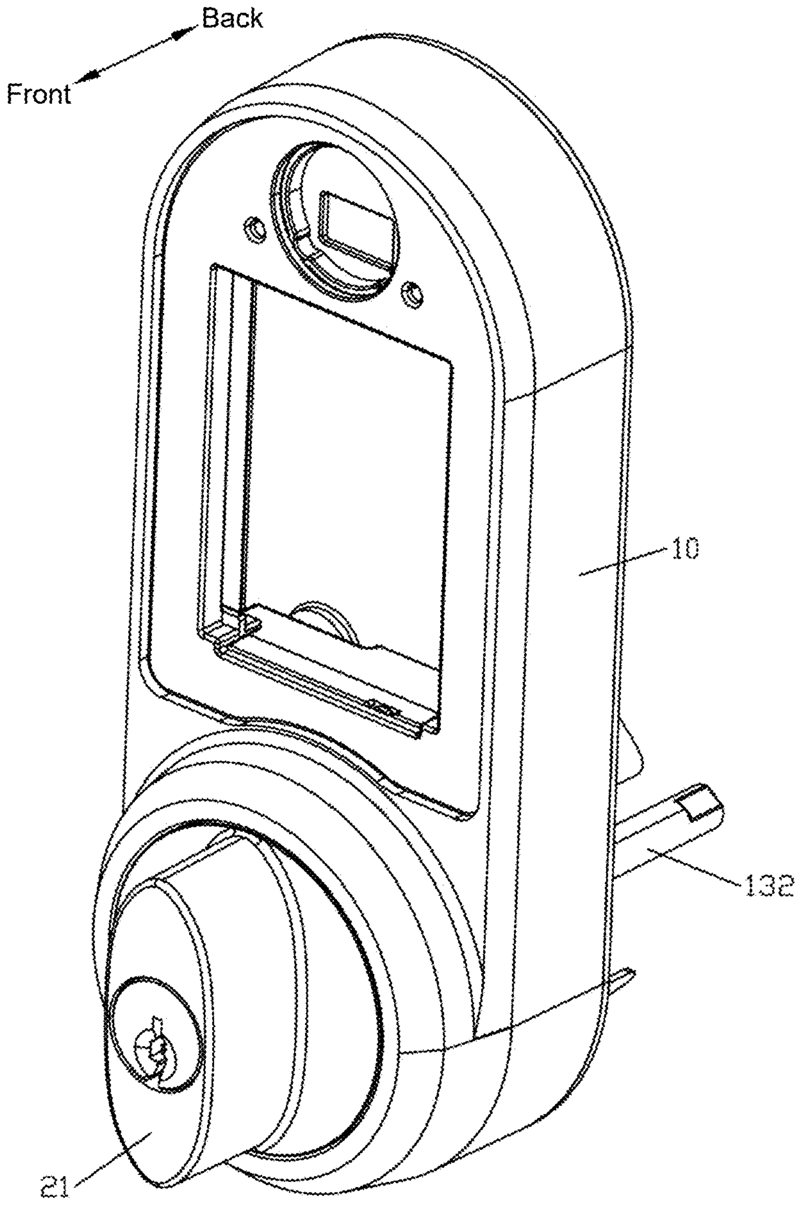
FIG. 1 is a structural diagram of an external lock.
Figure 2:
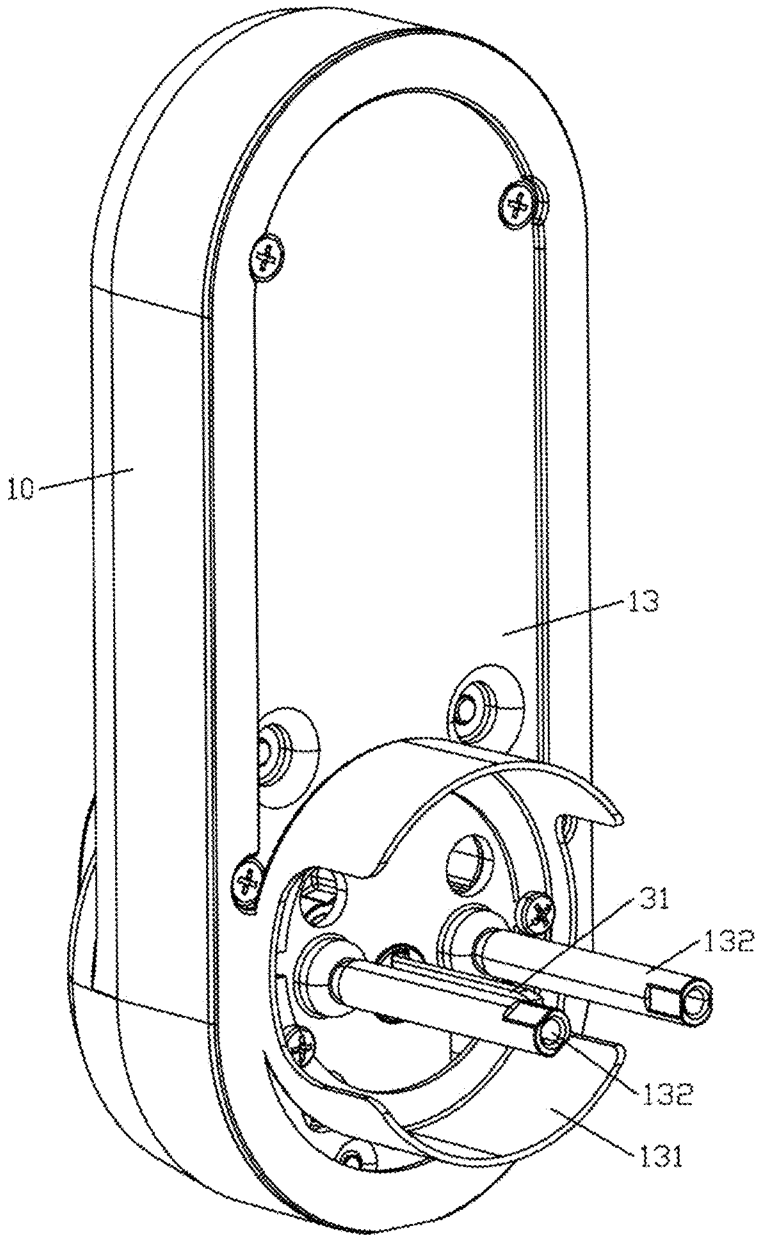
FIG. 2 is a structural diagram of an external lock from another perspective.
Figure 3:
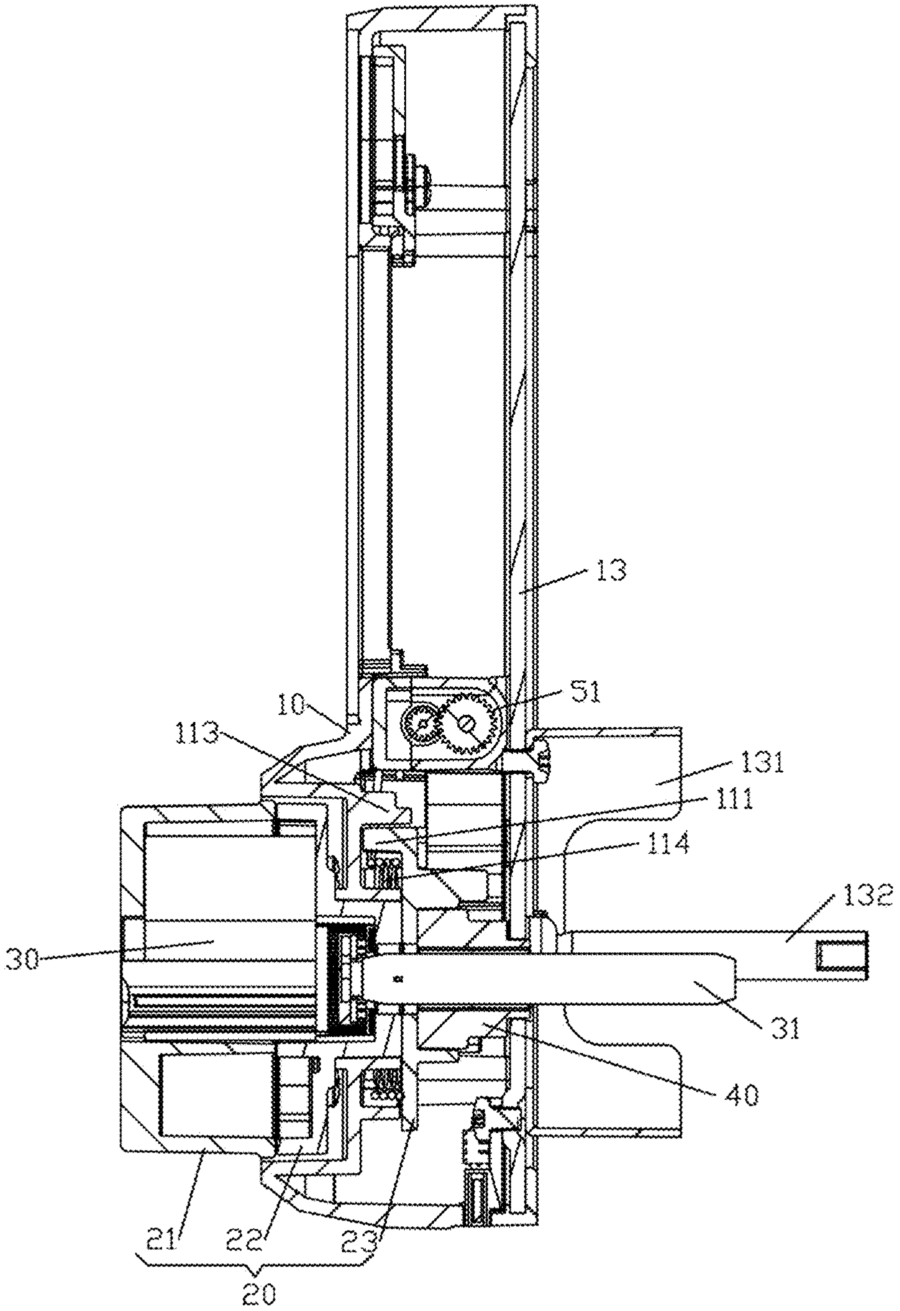
FIG. 3 is a sectional view of an external lock.

This section describes specific embodiments of the present disclosure in detail. Preferred embodiments of the present disclosure are shown in the accompanying drawings. The accompanying drawings play a role in supplementing text description of the specification using graphics, so that people can intuitively and visually understand each technical feature and overall technical solutions of the present disclosure. However, the accompanying drawings cannot be understood as limitations to the scope of protection of the present disclosure.

In the description of the present disclosure, it is to be understood that the description of orientations is involved, for example, the terms "up", "down", "front", "back", "left", "right", and the like denote orientations or positional relationships based on orientations or positional relationships shown in the accompanying drawings, merely for the convenience of describing the present disclosure and simplifying the description, rather than indicating or implying that the apparatus or element referred to must have a particular orientation or be constructed and operated in a particular orientation, and therefore cannot be understood as limitations to the present disclosure.

In the description of the present disclosure, if there is a description of the terms "first" and "second", they are only used for distinguishing technical features and should not be understood as indicating or implying relative importance, implicitly indicating the number of technical features indicated, or implicitly indicating the order of technical features indicated.

In the description of the present disclosure, the terms such as "dispose", "mount", and "connect" should be understood in a broad sense, unless otherwise clearly defined. Those skilled in the art can reasonably determine specific meanings of the above terms in the present disclosure with reference to specific content of technical solutions.

Referring to FIGS. 1 to 10, an electronic door lock with a clutch includes an external lock and a rear lock, where the external lock is mounted on an outer side of a door body, the rear lock is mounted on an inner side of the door body, and the lock body is mounted between the external lock and an internal lock in the door body.

The external lock includes a front housing 10, a front knob assembly 20, a lock cylinder 30, a clutch component 40, and a motor clutch assembly 50, where the front knob assembly 20 is rotatably inserted into the front housing 10, the front knob assembly 20 is provided with a convex column 231, a rotation limiting structure is disposed between the front housing 10 and the front knob assembly 20, and the rotation limiting structure is configured to limit a rotation angle of the front knob assembly 20 relative to the front housing 10, thereby limiting the convex column 231 to rotating only within a certain range along with the front knob assembly 20. The lock cylinder 30 is mounted on the front knob assembly 20, a tail end of the lock cylinder 30 is provided with a tail rack 31, and the tail rack 31 is configured to be connected to the lock body and is rotatable relative to the lock cylinder 30. The clutch component 40 is connected to the tail rack 31 to be capable of rotating together with the tail rack 31, and the clutch component 40 is rotatable relative to the front knob assembly 20. The motor clutch assembly 50 is disposed on the front housing 10 and is capable of being electrically driven to limit rotation of the clutch component 40 relative to the front knob assembly 20. The clutch component 40 is provided with convex portions 41, and the convex columns 41 are in press fit with the convex column 231; when the electronic door lock is unlocked, the convex portions 41 are located within a rotation range of the convex column 231; or when the electronic door lock is locked, the convex portions 41 are outside the rotation range of the convex column 231.

Specifically, the lock cylinder 30 has a lock core inside. When a key is not inserted, the tail rack 31 is rotatable relative to the lock core and the lock cylinder 30. After the key is inserted, the tail rack 31 is linked with the lock core, and the tail rack 31, the lock core, and the key are rotatable relative to the lock cylinder 30. The tail rack 31 is inserted into the clutch component 40 and the lock body separately. When the tail rack 31 rotates, the clutch component 40 is driven to rotate synchronously with the tail rack 31, and the lock body can be driven to operate for unlocking and locking. The motor clutch assembly 50 can be reversely supplied with power to operate reversely to be reset.

Figure 4:
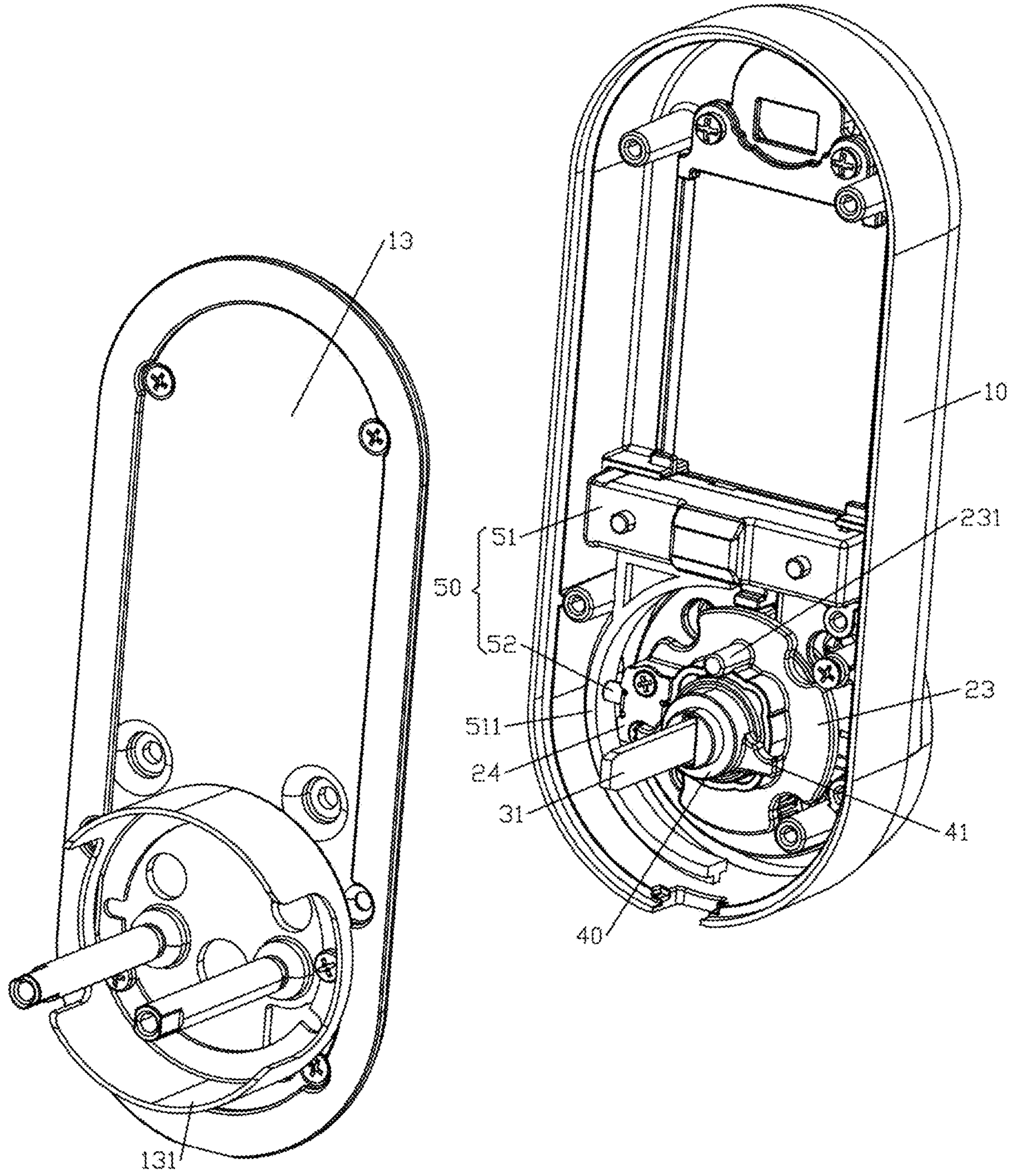
FIG. 4 is a first exploded view of an external lock.
Figure 5:
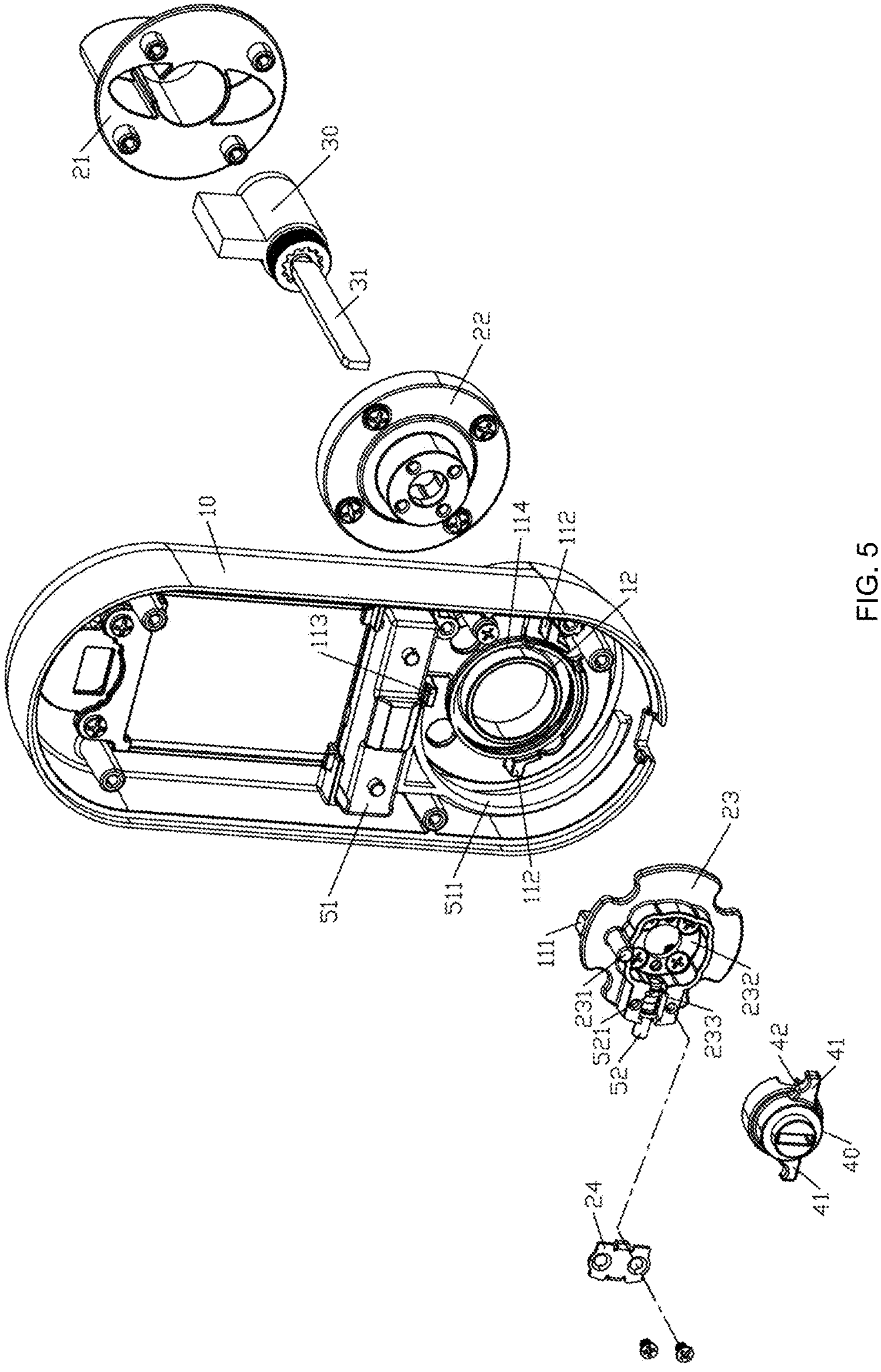
FIG. 5 is a second exploded view of an external lock.
Figure 6:
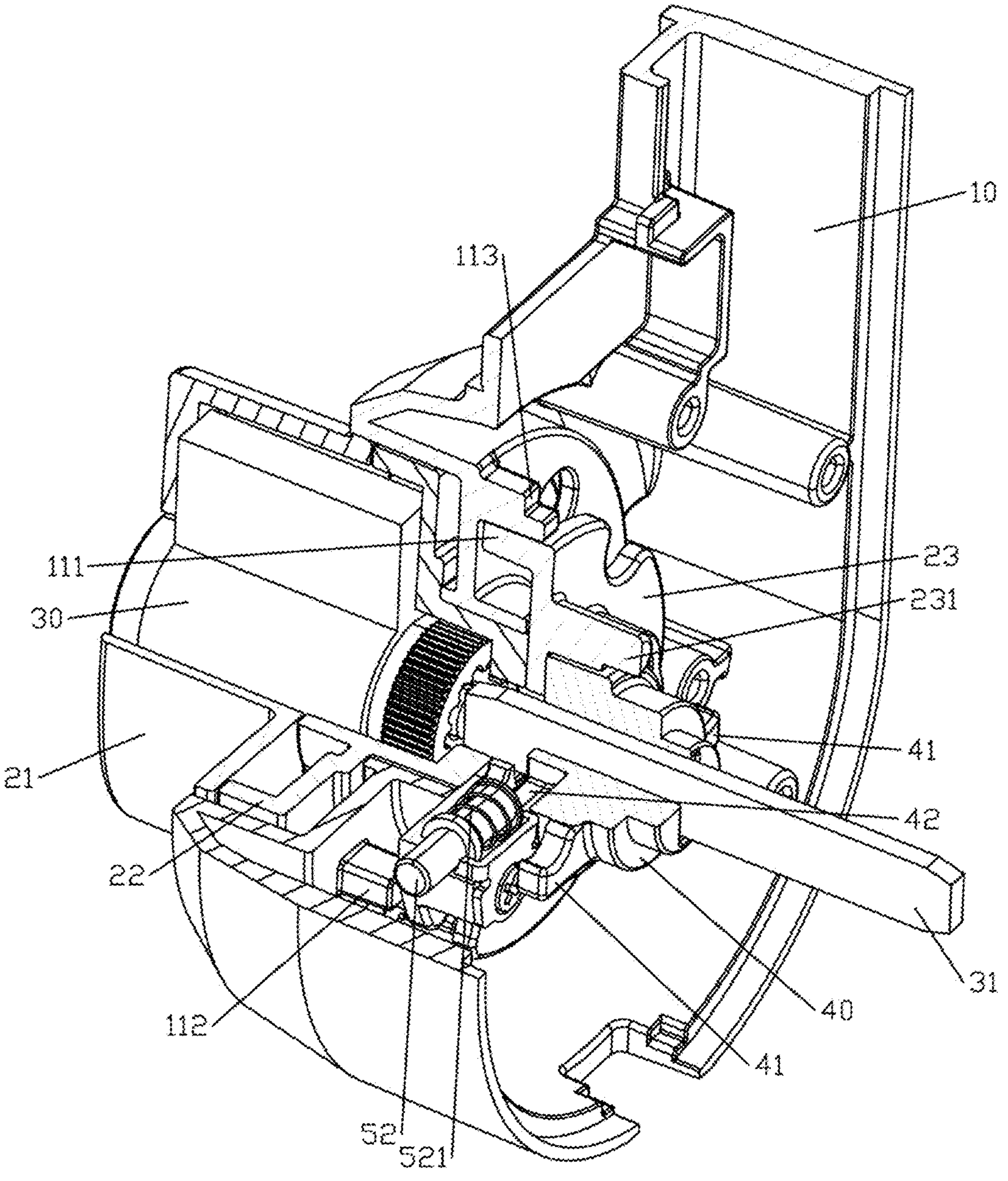
FIG. 6 is a sectional view of a partial structure of an external lock.
Figure 7:
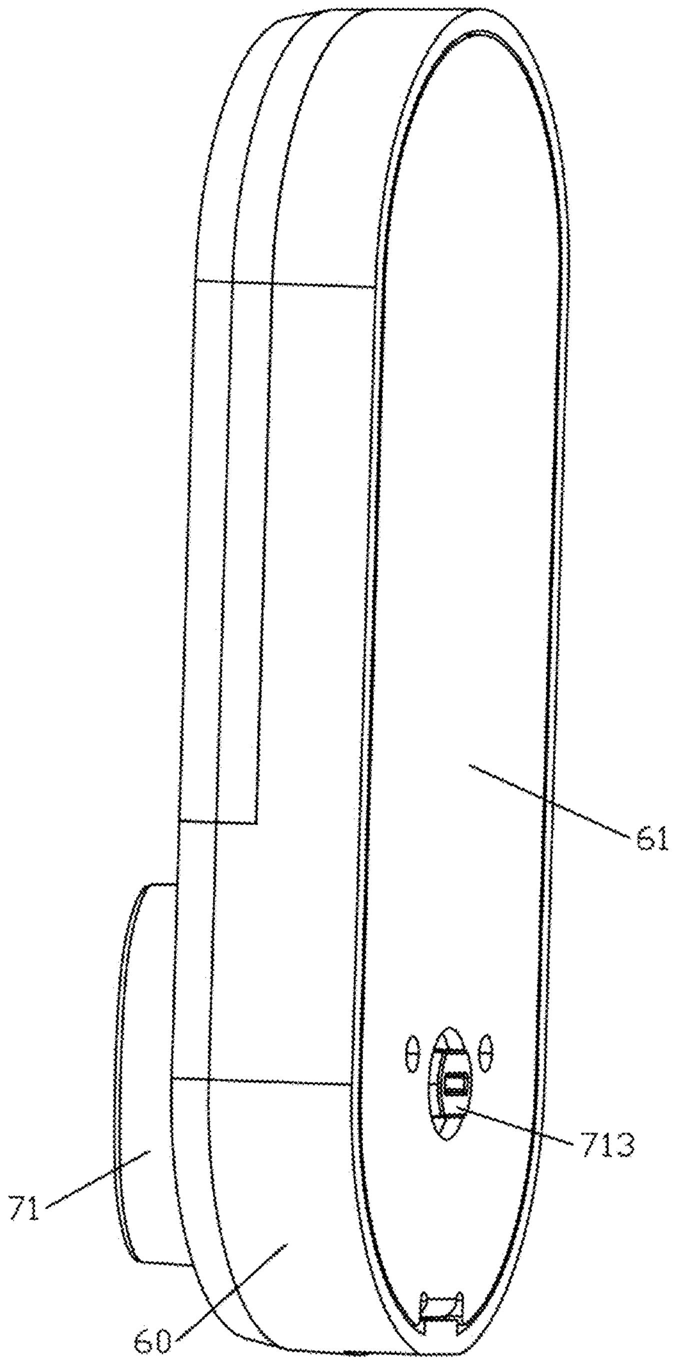
FIG. 7 is a structural diagram of a rear lock.
Figure 8:
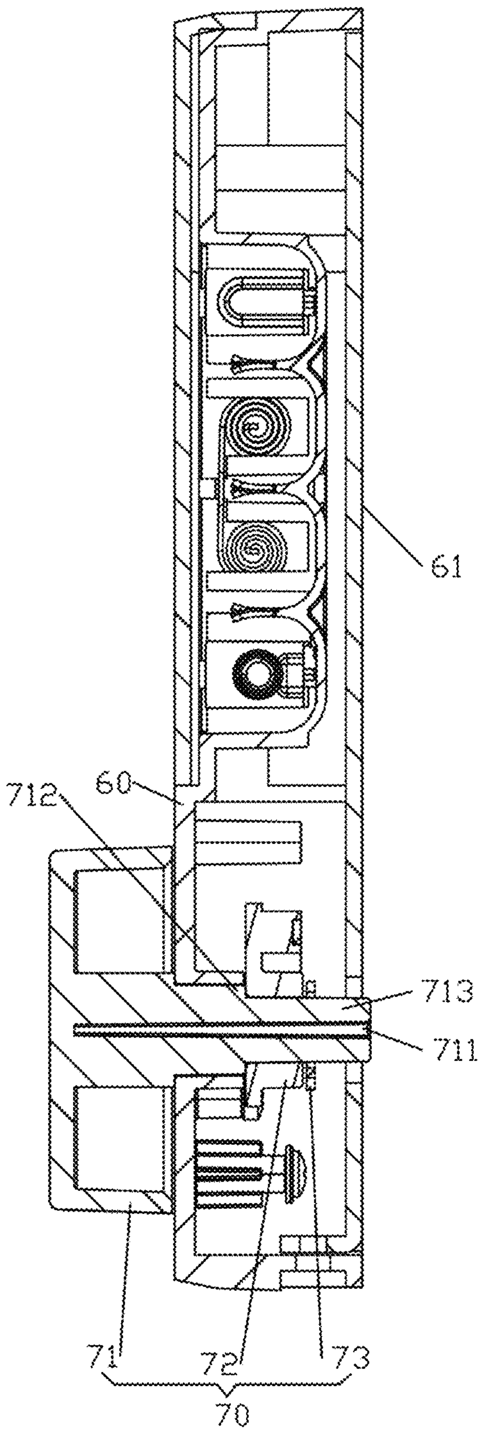
FIG. 8 is a sectional view of a rear lock.
Figure 9:
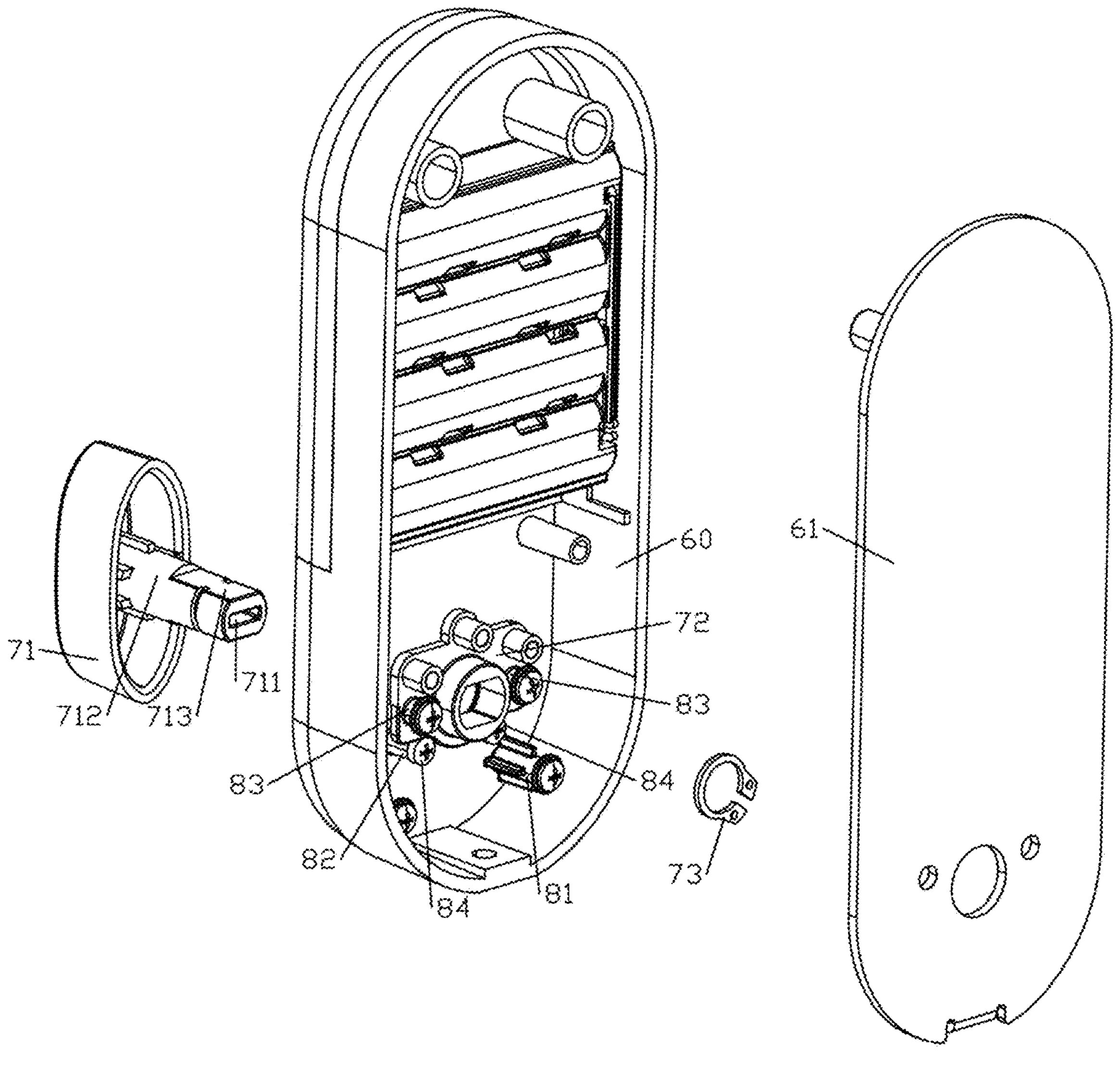
FIG. 9 is an exploded view of a rear lock.
Figure 10:
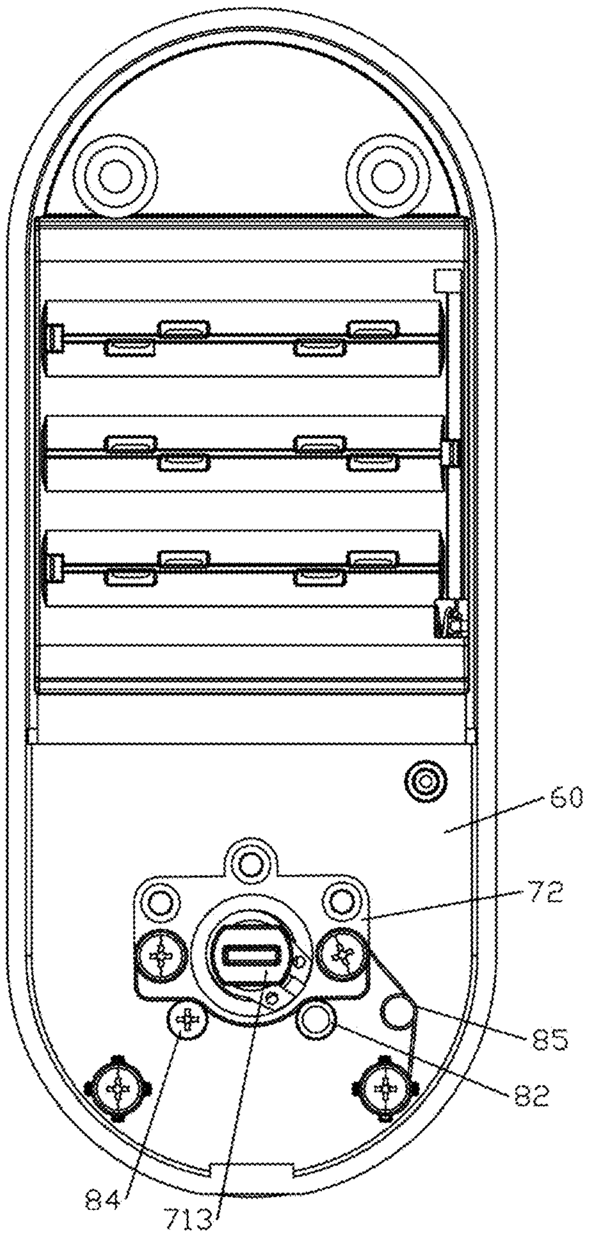
FIG. 10 is a rear view of a rear lock.

As shown in FIG. 4, the electronic door lock is in a locked state, and the motor clutch assembly 50 is reset. At this time, the motor clutch assembly 50 does not link the clutch component 40 with the front knob assembly 20, and when the front knob assembly 20 rotates, the clutch component 40 cannot be driven to rotate. If the convex portions 41 are outside the rotation range of the convex column 231, when the front knob assembly 20 rotates, the convex portions 41 cannot be pushed by the convex column 231 to drive the clutch component 40 to rotate.

Before unlocking, when the motor clutch assembly 50 is in the reset state, the front knob assembly 20 can only idle relative to the tail rack 31 and the clutch component 40, and the lock body cannot be driven by rotating the front knob assembly 20 to operate for unlocking. After the key is inserted, the lock body can be driven through rotation of the tail rack 31 by rotating the key to operate for unlocking. When the electronic door lock can be supplied with power, the motor clutch assembly 50 can be controlled by a control system of the electronic door lock to be powered to operate forwards. At this time, the motor clutch assembly 50 links the clutch component 40 with the front knob assembly 20, the front knob assembly 20 can be rotated to drive the clutch component 40 to rotate, and then the tail rack 31 can be rotated to drive the lock body to operate for unlock. After unlocking, the motor clutch assembly 50 operates reversely to be reset, and releases the linkage between the clutch component 40 and the front knob assembly 20.

After unlocking, the tail rack 31 and the clutch component 40 rotate at a certain angle relative to the state shown in FIG. 4. At this time, the convex portions 41 are located within the rotation range of the convex column 231. In this case, based on the reset of the motor clutch assembly 50 and no power supply, when the front knob assembly 20 is rotated, the convex portions 41 can be pushed by the convex column 231 to rotate the clutch component and the tail rack 31, thereby driving the lock body to operate for locking. After locking, the state returns to the state shown in FIG. 4, and continuing to rotate the front knob assembly 20 can only make it idle and cannot implement unlocking.

In summary, the electronic door lock can be locked and unlocked by inserting a key into the lock cylinder 30; when the electronic door lock can be supplied with power, the motor clutch assembly 50 is supplied with power and operates forward to link the front knob assembly 20 with the clutch component 40, and the front knob assembly 20 can be rotated for locking and unlocking; when the motor clutch assembly 50 is not supplied with power, the motor clutch assembly 50 is in a reset state, and the front knob assembly 20 can be rotated for locking without inserting the key, thereby bringing the use convenience for a user; during locking, the motor clutch assembly 50 does not need to be supplied with power to operate, which can reduce power consumption; and it is convenient for locking when the electronic door lock fails or the power is used up.

When the electronic door lock can be supplied with power and unlocking is needed, the control system will control the motor clutch assembly 50 to be powered to operate forwards only after receiving correct NFC, password, fingerprint, or other signals, thereby ensuring safety.

In this embodiment, the rotation limiting structure includes a first anti-rotation portion 111, second anti-rotation portions 112, and a third anti-rotation portion 113, where the first anti-rotation portion 111 is fixedly disposed on the front knob assembly 20, the second anti-rotation portions 112 and the third anti-rotation portion 113 are both fixedly disposed on the front housing 10, the two second anti-rotation portions 112 are disposed on two sides of the third anti-rotation portion 113 respectively, the front housing 10 is fixedly provided with a surrounding edge portion 12 arranged around the front knob assembly 20, and an outer side of the surrounding edge portion 12 is sleeved with a first torsion spring 114. During assembly, one torsion arm of the first torsion spring 114 is located on one side of each of the first anti-rotation portion 111 and the third anti-rotation portion 113, and the other torsion arm of the first torsion spring 114 is located on the other side of each of the first anti-rotation portion 111 and the third anti-rotation portion 113. When the front knob assembly 20 rotates, the first anti-rotation portion 111 presses against the second anti-rotation portions 112 to limit the rotation angle of the front knob assembly 20. Through this structure, the convex column 231 can rotate within a certain angle range. After being rotated, the front knob assembly 20 can be reset using the torsion spring (the reset state of the front knob assembly 20 is as shown in FIG. 4).

In this embodiment, the front knob assembly 20 includes a front knob cap 21, a fixed component 22, and a rotating component 23, where the front knob cap 21 and the rotating component 23 are disposed on two sides of the front housing 10 respectively, the fixed component 22 is rotatably inserted into the front housing 10, the fixed component 22 is fixedly connected to the front knob cap 21 and the rotating component 23 by screws separately, a fixed cavity is defined between the front knob cap 21 and the fixed component 22, the lock cylinder 30 is inserted into the fixed cavity, and the tail rack 31 extends backward from the rotating component 23.

In this embodiment, a rear side of the rotating component 23 is provided with a first mounting groove 232, the clutch component 40 is rotatably inserted into the first mounting groove 232, and the tail rack 31 penetrates through the clutch component 40. Through this structure, the clutch component 40 can be rotatably mounted on the front knob assembly 20.

In this embodiment, the motor clutch assembly 50 includes a motor clutch 51, a pin 52, and a spring component 521, where the motor clutch 51 is disposed on the front housing 10, an output end of the motor clutch 51 is provided with a pressing strip 511, the pin 52 is slidably inserted into the front knob assembly 20 and located between the clutch component 40 and the pressing strip 511, a sidewall of the clutch component 40 is provided with clutch grooves 42 for insertion of the pin 52, the spring component 521 is disposed between the pin 52 and the front knob assembly 20, the motor clutch 51 is configured to push the pin 52 by the pressing strip 511 to move towards the clutch component 40, and the spring component 521 is configured to push the pin 52 to move away from the clutch component 40. Specifically, the rotating component 23 is provided with a second mounting groove 233, two ends of the second mounting groove 233 are through, the pin 52 and the spring component 521 are located in the second mounting groove 233, and the second mounting groove 233 is covered with a limiting cover 24 to prevent the pin 52 and the spring component 521 from separating therefrom. When the electronic door lock is locked, the clutch grooves 42 are opposite to the pin 52, and when the motor clutch 51 is reset, the pin 52 leaves the clutch grooves 42. When powered, the motor clutch 51 can drive the pressing strip 511 to move. The pressing strip 511 pushes the pin 52 to move towards the clutch component 40 to be inserted into the clutch grooves 42 to link the front knob assembly 20 with the clutch component 40, thereby limiting their relative rotation. The front knob assembly 20 can be rotated for unlocking.

The two clutch grooves 42 are disposed on two sides of the clutch component 40 respectively, and the two convex portions 41 are also disposed on the two sides of the clutch component 40 respectively. Through this structure, the lock body can be bidirectionally mounted to be adaptively mounted on left-handed and right-handed doors.

In this embodiment, a rear side of the front housing 10 is provided with a first cover 13 by means of screw connection, a rear side of the first cover 13 is provided with a cylinder shell 131 and column rods 132, the column rods 132 are located on an inner side of the cylinder shell 131, and the at least two column rods are arranged in parallel. The cylinder shell 131 is configured to be inserted into a door opening in the door, the lock body is sleeved on the column rods 132 in a matched manner, and the rear lock can be connected and fixed to the column rods 132 by screws to accurately mount the electronic door lock on the door.

In some embodiments, the clutch component 40 may also be rotatably mounted on the front housing 10 or the first cover 13.

In this embodiment, the rear lock includes a rear housing 60 and a rear knob assembly 70 disposed on the rear housing 60, where the rear housing 60 is fixedly mounted with a second cover 61 by screws, and the rear knob assembly 70 is provided with a transmission insertion hole 711 opposite to the tail rack 31. During assembly, the tail rack 31 penetrates through the lock body and is inserted into the transmission insertion hole 711.

The rear knob assembly 70 includes a rear knob cap 71, a limiting component 72, and a snap spring 73, where the rear knob cap 71 and the limiting component 72 are disposed on two sides of the rear housing 60 respectively, the rear knob cap 71 has a shaft section 712 rotatably inserted into the rear housing 60 and a mounting section 713 inserted into the limiting component 72 in a sliding fit manner, a section of the mounting section 713 is in a non-circular shape such as a runway shape or a prism shape to restrict relative rotation of the rear knob cap 71 and the limiting component 72, the aforementioned transmission insertion hole 711 is formed in an end part of the mounting section 713, and the snap spring 73 is located on one side of the limiting component 72 facing away from the rear housing 60 and is snapped and sleeved on the mounting section 713. Through this structure, the rear knob assembly 70 can be rotatably mounted on the rear housing 60.

Elastic limiting structures are disposed between the limiting component 72 and the rear housing 60. Each of the elastic limiting structures includes a first limiting column 81, a second limiting column 82, a third limiting column 83, a limiting screw 84, and a second torsion spring 85, where the first limiting column 81 and the second limiting column 82 are fixedly disposed on the rear housing 60 at intervals, the third limiting column 83 is fixedly disposed on the limiting component 72, the limiting screw 84 is disposed on the second limiting column 82 and abuts against a sidewall of the limiting component 72, and the second torsion spring 85 is fixedly connected to the first limiting column 81 and the third limiting column 83 separately. Specifically, end parts of the two torsion arms of the first torsion spring 114 are both coiled in a ring shape, an end part of one torsion arm of the second torsion spring 85 is sleeved on the first limiting column 81, an end part of the other torsion arm of the second torsion spring 85 is sleeved on the third limiting column 83, and screws are mounted at tops of both the first limiting column 81 and the third limiting column 83 to limit separation of the torsion arms.

In this embodiment, the two elastic limiting structures are disposed on two sides of the shaft section 712 respectively, and the two limiting screws 84 simultaneously abut against two sides of the limiting component 72 to limit its rotation. During mounting, one of the limiting screws 84 and the corresponding second torsion spring 85 are dismantled based on a direction of opening the door, so that the rear knob assembly 70 is rotatable within a certain range.

In the above solution, the functions of the motor clutch 51 and the lock cylinder 30 are both possessed by existing products on the market. The motor clutch 51 and the lock cylinder 30 with the above functions can be obtained through external purchase. Their structures are understood by those skilled in the art and will not be additionally described in detail herein.

The embodiments of the present disclosure have been described in detail above with reference to the accompanying drawings, but the present disclosure is not limited to the above embodiments. Various changes may also be made within the scope of knowledge possessed by those of ordinary skill in the art without departing from the purpose of the present disclosure.

The invention claimed is:

1. An electronic door lock with a clutch, comprising an external lock, wherein the external lock comprises:

a front housing;

a front knob assembly rotatably inserted into the front housing, wherein a rotation limiting structure is disposed between the front housing and the front knob assembly, and the rotation limiting structure is configured to limit a rotation angle of the front knob assembly relative to the front housing;

a lock cylinder mounted on the front knob assembly and provided with a tail rack at a tail end, wherein the tail rack is configured to be connected to a lock body and is rotatable relative to the lock cylinder;

a clutch component that is connected to the tail rack to be capable of rotating together with the tail rack and is rotatable relative to the front knob assembly; and a motor clutch assembly that is disposed on the front housing and is capable of being electrically driven to limit rotation of the clutch component relative to the front knob assembly, wherein the clutch component is provided with convex portions, and the front knob assembly is provided with a convex column in press fit with the convex portions; when the electronic door lock is unlocked, the convex portions are located within a rotation range of the convex column; or when the electronic door lock is locked, the convex portions are outside the rotation range of the convex column; wherein the front knob assembly is rotatable to drive the tail rack for locking without power to the motor clutch assembly and without a key, when the convex portions are within the rotation range of the convex column.

2. The electronic door lock with a clutch according to claim 1, wherein the rotation limiting structure comprises a first anti-rotation portion, second anti-rotation portions, and a third anti-rotation portion, the first anti-rotation portion is fixedly disposed on the front knob assembly, the second anti-rotation portions and the third anti-rotation portion are both fixedly disposed on the front housing, the two second anti-rotation portions are disposed on two sides of the third anti-rotation portion respectively, and when the front knob assembly rotates, the first anti-rotation portion is capable of pressing against the second anti-rotation portions; and the front knob assembly or the front housing is sleeved with a first torsion spring, and two torsion arms of the first torsion spring are disposed on two sides of each of the first anti-rotation portion and the third anti-rotation portion respectively.

3. The electronic door lock with a clutch according to claim 1, wherein the front knob assembly comprises a front knob cap, a fixed component, and a rotating component, the front knob cap and the rotating component are disposed on two sides of the front housing respectively, the fixed component is rotatably inserted into the front housing and is fixedly connected to the front knob cap and the rotating component separately, a fixed cavity is defined between the front knob cap and the fixed component, the lock cylinder is disposed in the fixed cavity, and the tail rack extends backward from the rotating component.

4. The electronic door lock with a clutch according to claim 3, wherein a rear side of the rotating component is provided with a first mounting groove, the clutch component is rotatably inserted into the first mounting groove, and the tail rack penetrates through the clutch component.

5. The electronic door lock with a clutch according to claim 1, wherein the motor clutch assembly comprises a motor clutch, a pin, and a spring component, the motor clutch is disposed on the front housing and is provided with a pressing strip at an output end, the pin is slidably inserted into the front knob assembly and located between the clutch component and the pressing strip, a sidewall of the clutch component is provided with clutch grooves for insertion of the pin, and the spring component is disposed between the pin and the front knob assembly; the motor clutch is configured to push the pin by the pressing strip to move towards the clutch component, and the spring component is configured to push the pin to move away from the clutch component; and when the electronic door lock is locked, the clutch grooves are opposite to the pin.

6. The electronic door lock with a clutch according to claim 5, wherein the two clutch grooves are disposed on two sides of the clutch component respectively, and the two convex portions are also disposed on the two sides of the clutch component respectively.

7. The electronic door lock with a clutch according to claim 1, wherein a rear side of the front housing is provided with a first cover, a rear side of the first cover is provided with a cylinder shell and column rods located on an inner side of the cylinder shell, and the at least two column rods are arranged in parallel.

8. The electronic door lock with a clutch according to claim 1, further comprising a rear lock, wherein the rear lock comprises a rear housing and a rear knob assembly disposed on the rear housing, and the rear knob assembly is provided with a transmission insertion hole opposite to the tail rack.

9. The electronic door lock with a clutch according to claim 8, wherein the rear knob assembly comprises a rear knob cap, a limiting component, and a snap spring, the rear knob cap and the limiting component are disposed on two sides of the rear housing respectively, the rear knob cap has a shaft section rotatably inserted into the rear housing and a mounting section slidably inserted into the limiting component, the snap spring is located on one side of the limiting component facing away from the rear housing and is snapped and sleeved on the mounting section, and elastic limiting structures are disposed between the limiting component and the rear housing.

10. The electronic door lock with a clutch according to claim 9, wherein each of the elastic limiting structures comprises a first limiting column, a second limiting column, a third limiting column, a limiting screw, and a second torsion spring, the first limiting column and the second limiting column are fixedly disposed on the rear housing at intervals, the third limiting column is fixedly disposed on the limiting component, the limiting screw is disposed on the second limiting column and abuts against a sidewall of the limiting component, and the second torsion spring is fixedly connected to the first limiting column and the third limiting column separately; and the two elastic limiting structures are disposed on two sides of the shaft section respectively.

* * * * *